(12) United States Patent
Uchikawa

(10) Patent No.: US 9,319,558 B2
(45) Date of Patent: Apr. 19, 2016

(54) DATA PROCESSING SYSTEM

(75) Inventor: Hiroshi Uchikawa, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/022,862

(22) Filed: Feb. 8, 2011

(65) Prior Publication Data

US 2011/0131585 A1 Jun. 2, 2011

Related U.S. Application Data

(60) Continuation of application No. 11/006,621, filed on Dec. 8, 2004, now Pat. No. 7,913,260, which is a division of application No. 10/206,183, filed on Jul. 29, 2002, now Pat. No. 6,832,375, which is a division of application No. 09/353,616, filed on Jul. 15, 1999, now Pat. No. 6,499,068.

(30) Foreign Application Priority Data

Jul. 23, 1998 (JP) .................................. 10-223602
Jul. 23, 1998 (JP) .................................. 10-223603

(51) Int. Cl.
*G06F 9/54* (2006.01)
*H04N 1/32* (2006.01)
*H04N 1/00* (2006.01)

(52) U.S. Cl.
CPC ......... *H04N 1/32561* (2013.01); *H04N 1/0048* (2013.01); *H04N 1/00912* (2013.01); *H04N 1/00954* (2013.01); *H04N 1/32069* (2013.01); *H04N 2201/0094* (2013.01)

(58) Field of Classification Search
CPC .......... H04N 1/32037; H04N 1/32064; H04N 2201/3278; H04N 9/4843; H04N 1/32561; H04N 1/00954; H04N 1/32069; H04N 1/00912; H04N 2201/0094; H04N 1/0048; G06F 9/4843

See application file for complete search history.

(56) References Cited

U.S. PATENT DOCUMENTS

| 3,643,227 | A |   | 2/1972 | Smith et al. ................. 340/172.5 |
| 5,115,392 | A | * | 5/1992 | Takamoto et al. ............ 718/101 |
| 5,196,843 | A | * | 3/1993 | Yoshino ........................ 340/9.13 |
| 5,410,416 | A |   | 4/1995 | Amberg et al. ............... 358/405 |
| 5,813,348 | A |   | 9/1998 | Zingher ........................ 101/494 |

(Continued)

FOREIGN PATENT DOCUMENTS

| JP | 58-019059 A | 2/1983 |
| JP | 61-006583 A | 1/1986 |

(Continued)

*Primary Examiner* — Syed Roni
(74) *Attorney, Agent, or Firm* — Fitzpatrick, Cella, Harper & Scinto

(57) ABSTRACT

A data processing apparatus is constructed by an input device for inputting an instruction for causing a job processor to perform a job, an analyzing unit for analyzing the instruction inputted by the input device, a discriminating unit for discriminating a processing ability of the job processor which performs the job based on the instruction inputted by the input device, and a controller for controlling a supply of the instruction inputted by the input device to the job processor in accordance with a result of the analysis by the analyzing unit and a result of the discrimination by the discriminating unit. The job processor performs a job to transmit input data to another apparatus, and the input device inputs an instruction including a designation of destinations to transmit data by the job processor.

13 Claims, 15 Drawing Sheets

(56) References Cited

U.S. PATENT DOCUMENTS

| | | | |
|---|---|---|---|
| 5,870,089 A | 2/1999 | Fabbio et al. | 345/335 |
| 5,870,604 A | 2/1999 | Yamagishi | 395/675 |
| 5,937,162 A * | 8/1999 | Funk et al. | 709/206 |
| 5,978,560 A | 11/1999 | Tan et al. | 395/114 |
| 5,990,886 A * | 11/1999 | Serdy et al. | 715/752 |
| 5,999,526 A | 12/1999 | Garland et al. | 370/352 |
| 6,101,548 A * | 8/2000 | Okada | 709/236 |
| 6,157,465 A | 12/2000 | Suda et al. | 358/407 |
| 6,556,666 B1 * | 4/2003 | Beyda et al. | 379/88.12 |
| 7,136,184 B2 | 11/2006 | Tonegawa | 358/1.15 |
| 2002/0062363 A1 * | 5/2002 | Naylor et al. | 709/223 |
| 2003/0174132 A1 | 9/2003 | Kunimatsu et al. | 345/419 |

FOREIGN PATENT DOCUMENTS

| | | | | |
|---|---|---|---|---|
| JP | 05-191617 A | 7/1993 | | |
| JP | 06-098137 A | 4/1994 | | |
| JP | 06-152644 A | 5/1994 | | |
| JP | 08-204878 A | 8/1996 | | |
| JP | 10-042068 A | 2/1998 | | |
| JP | 10042068 | * | 2/1998 | H04N 11/00 |
| JP | 10-190768 A | 7/1998 | | |
| JP | 11-055486 A | 2/1999 | | |

* cited by examiner

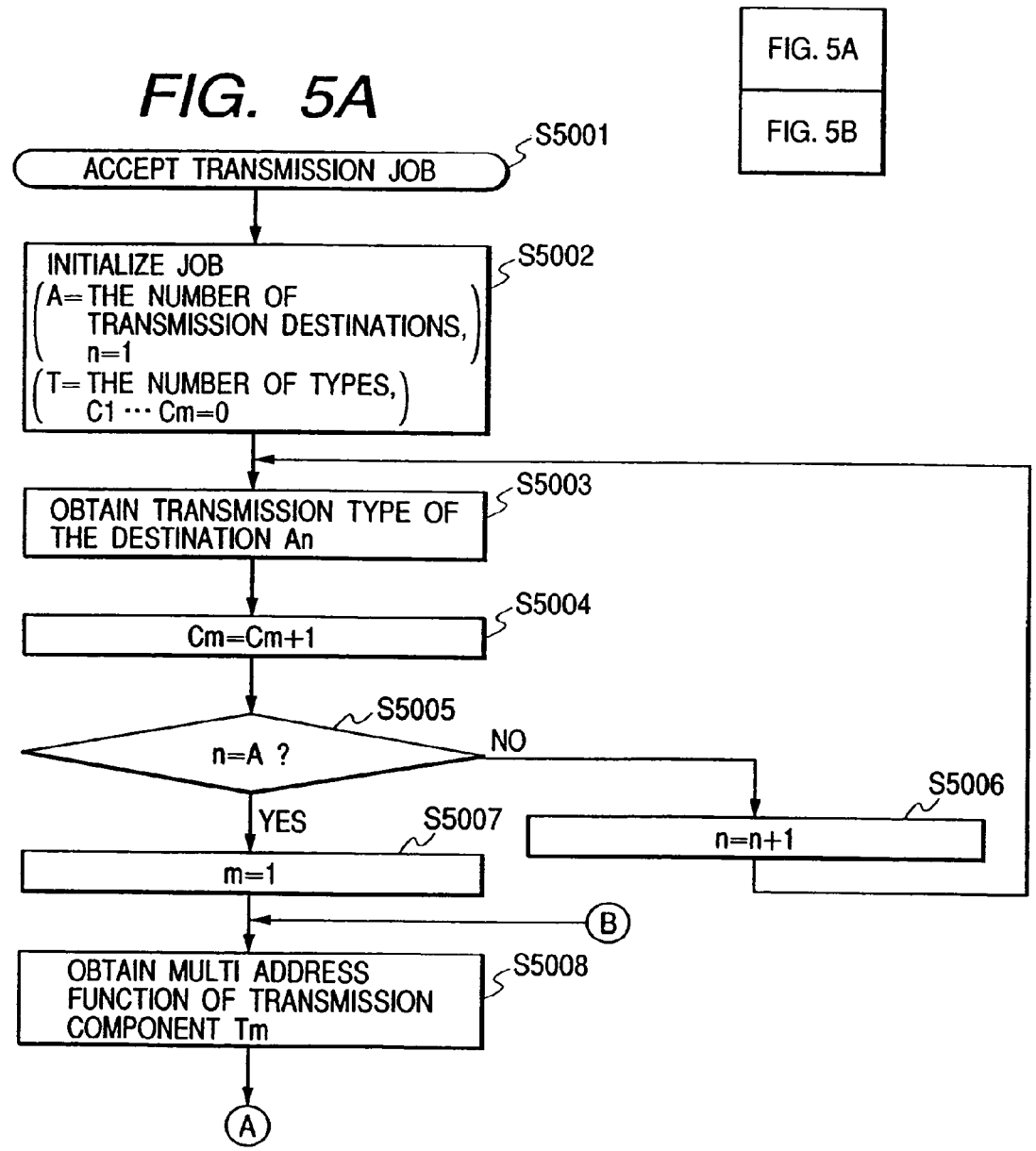

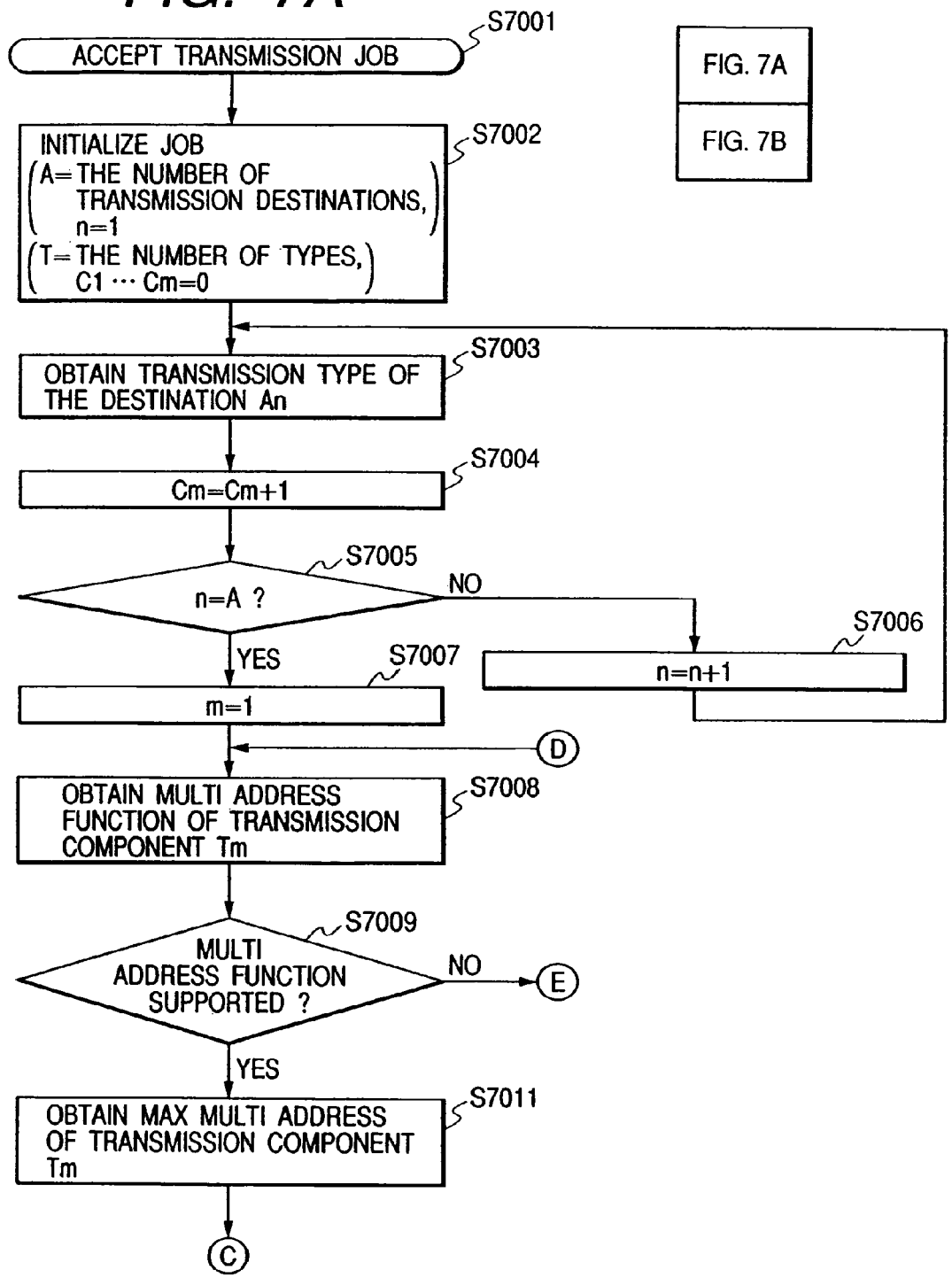

FIG. 8

| NAME | TYPE | ADDRESS | DATA TYPE | COMPRESSION TYPE | BITS PER PIXEL |
|---|---|---|---|---|---|
| PRINTER1/*Inc/JP | print | printer1./*.co.jp | LIPS | — | 1 |
| PRINTER2/*Inc/JP | print | printer2./*.co.jp | PCL | — | 1 |
| FAX1/***Inc/JP | fax | 012-345-6789 | TIFF | MMR | 1 |
| FAX1/***Inc/JP | fax | 987-654-3210 | TIFF | MH | 1 |
| DB1/*Inc/JP | database | db1.*.co.jp/folder1 | JFIF | jpeg | 8 |
|  |  |  | TIFF | MMR | 1 |
| DB2/*Inc/JP | database | db1.*.co.jp/folder1 | TIFF | — | 1 |
|  |  |  | JFIF | jpeg | 8 |
| USER1/*Inc/JP | mail | user1@*.co.jp | TIFF | MMR | 1 |
| USER2/*Inc/JP | mail | user2@*.co.jp | TIFF | — | |
|  |  |  | JFIF | jpeg | 8 |

FIG. 9

| CAPABILITY | VALUE |
|---|---|
| MULTI ADDRESS | TRUE |
| MAX MULTI ADDRESS | 8 |

FIG. 10

| DATA TYPE | COMPRESSION TYPE | BITS PER PIXEL |
|---|---|---|
| LIPS | — | 1 |
| CaPSL | — | 1 |
| TIFF | — | 1 |
| TIFF | MH | 1 |
| TIFF | MMR | 1 |
| JFIF | jpeg | 8 |

FIG. 11

| CAPABILITY | VALUE |
|---|---|
| MAX JOBS | 3 |

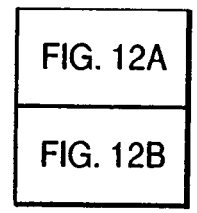
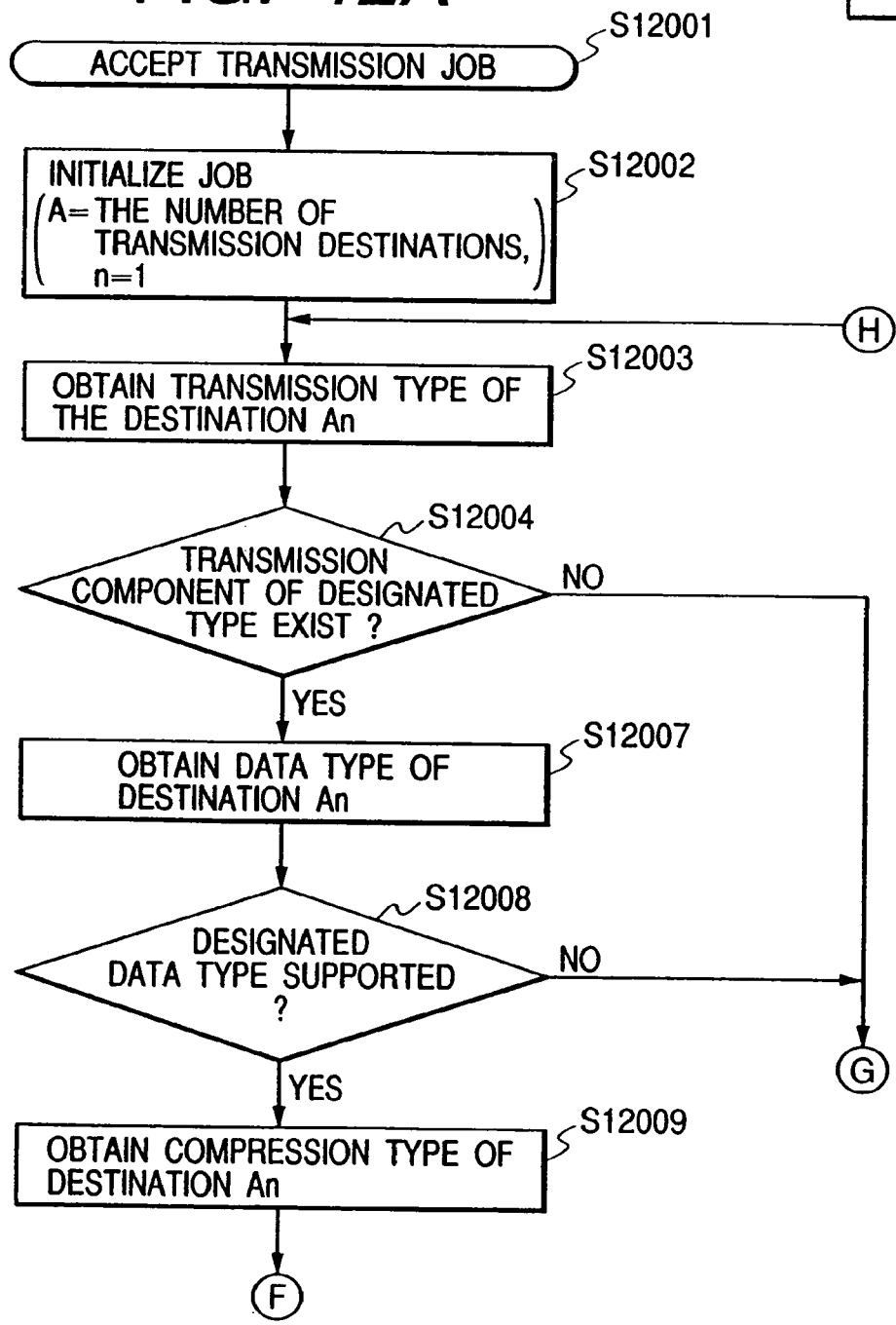
FIG. 12

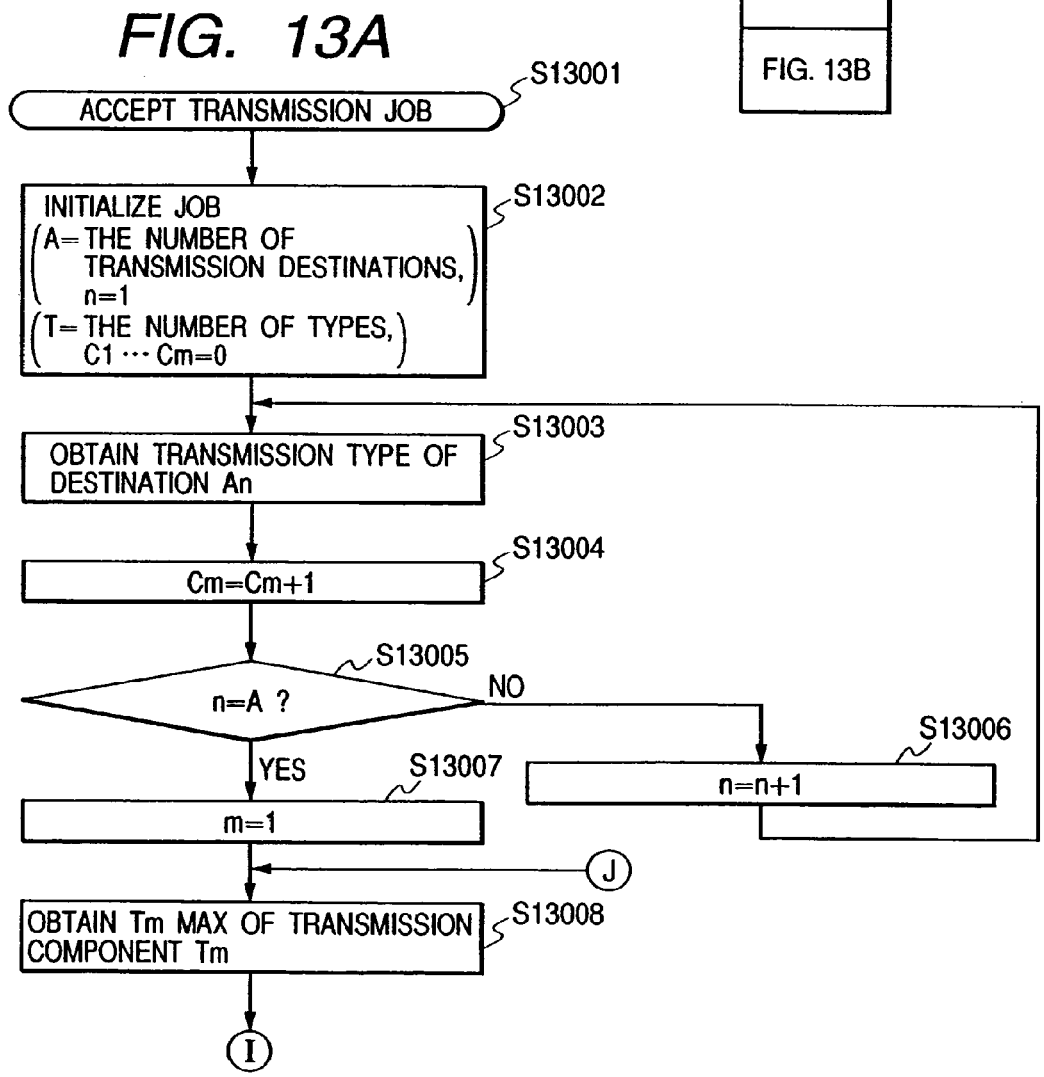

DATA PROCESSING SYSTEM

CROSS REFERENCE TO RELATED APPLICATIONS

The present application is a continuation of U.S. patent application Ser. No. 11/006,621, filed Dec. 8, 2004, now U.S. Pat. No. 7,913,260, which is a division of U.S. patent application Ser. No. 10/206,183, filed Jul. 29, 2002, now U.S. Pat. No. 6,832,375, which is a division of U.S. patent application Ser. No. 09/353,616, filed Jul. 15, 1999, now U.S. Pat. No. 6,499,068. The entire disclosure of each prior application is incorporated by reference herein.

BACKGROUND OF THE INVENTION

1. Field of the Invention

The invention relates to a data processing system for executing a job in accordance with an inputted instruction.

2. Related Background Art

Hitherto, there has been known a data transmission system which is constructed by a plurality of different kinds of transmission components to perform processes for actual data transmission and a transmission manager to manage the transmission components and accept an instruction from the operator and can simultaneously transmit data to a plurality of destinations.

In the above data transmission system, hitherto, if an instruction to simultaneously transmit common data to a plurality of destinations is accepted, a process command is sequentially issued one by one from the transmission manager to the transmission components in accordance with each destination information, thereby transmitting the data to each transmission destination.

In the above conventional technique, therefore, even if a plurality of destinations using the same transmission component are designated, a plurality of process commands in which only the destinations are different are issued from the transmission manager to the same transmission component. Thus, an efficiency is low in the case where data processes are executed one by one in the transmission component.

For example, even if the transmission component has a function (for example, transmitting process of E-mail) which can perform transmitting processes for a plurality of destinations in a lump, the processes are executed one by one for every destination, so that the efficiency is very low.

Hitherto, in case of changing the function or specification of such a data transmission system, it is necessary to change both the transmission manager and the transmission component and it is very uneconomical.

SUMMARY OF THE INVENTION

It is an object of the invention to provide a data processing system which can eliminate the foregoing problems.

Another object of the invention is to provide a data processing system which can perform a process according to characteristics of a transmission method to be selected in accordance with a designated destination.

Still another object of the invention is to provide a data processing system which can control a job in accordance with the ability of a transmission component to execute a data transmitting process.

The above and other objects and features of the present invention will become apparent from the following detailed description and the appended claims with reference to the accompanying drawings.

BRIEF DESCRIPTION OF THE DRAWINGS

FIGS. 8, 9, 10 and 11 are diagrams showing examples of data which is used in the embodiments of the invention;

DETAILED DESCRIPTION OF THE PREFERRED EMBODIMENTS

First Embodiment

Figure 1:
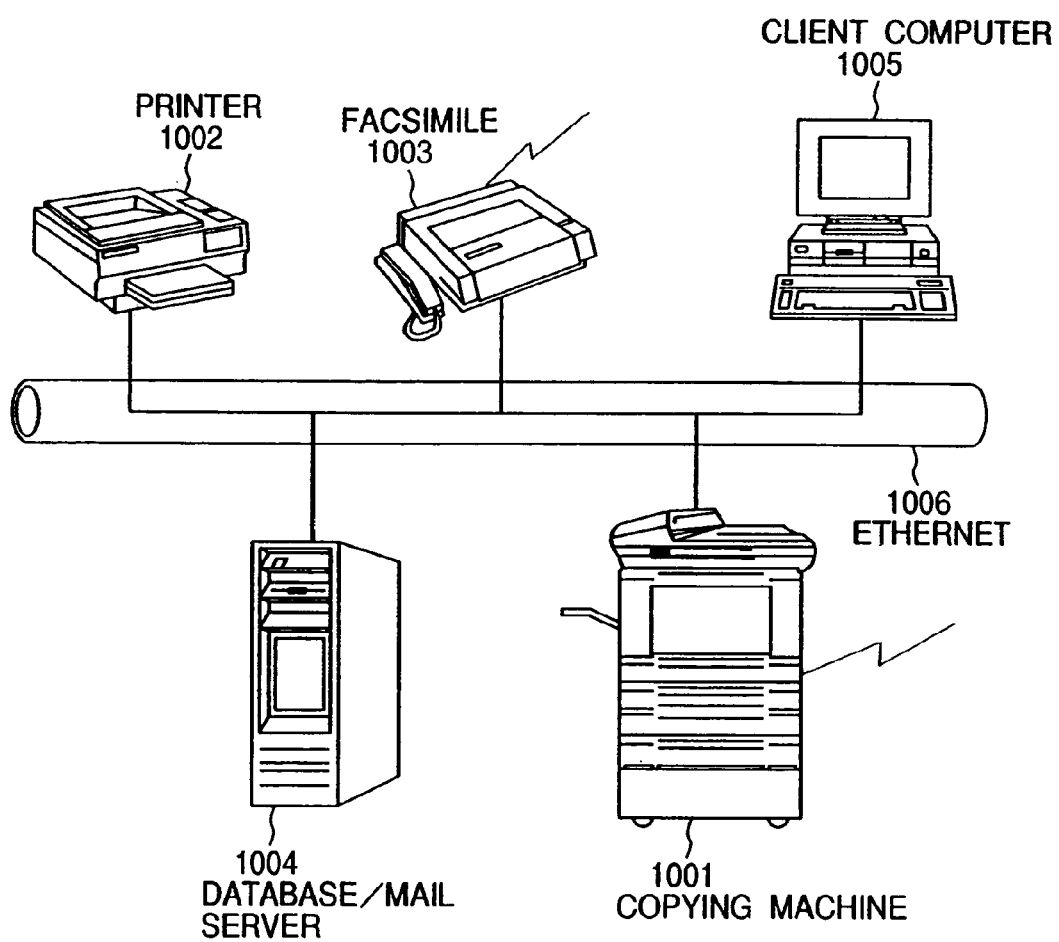
FIG. 1 is a diagram showing an example of a system construction in an embodiment of the invention.

FIG. 1 is an explanatory diagram showing a fundamental system construction in the first embodiment of the invention.

A copying machine 1001 is an apparatus having a copying function or the like for reading an image on an original and printing it onto a recording paper. A printer 1002 is an apparatus having a function or the like for printing images based on various input data. A facsimile 1003 is an apparatus having a function or the like for transmitting and receiving image data through a telephone line.

A database/mail server 1004 is a computer having a function to store various data to be handled in the present system and a well-known mail exchanging function. A client computer 1005 is a computer which is connected to the database/mail server 1004 and executes various data processes and a network function.

An Ethernet 1006 is a network to which various apparatuses such as copying machine 1001, printer 1002, facsimile 1003, database/mail server 1004, client computer 1005, and the like are connected.

Figure 2:
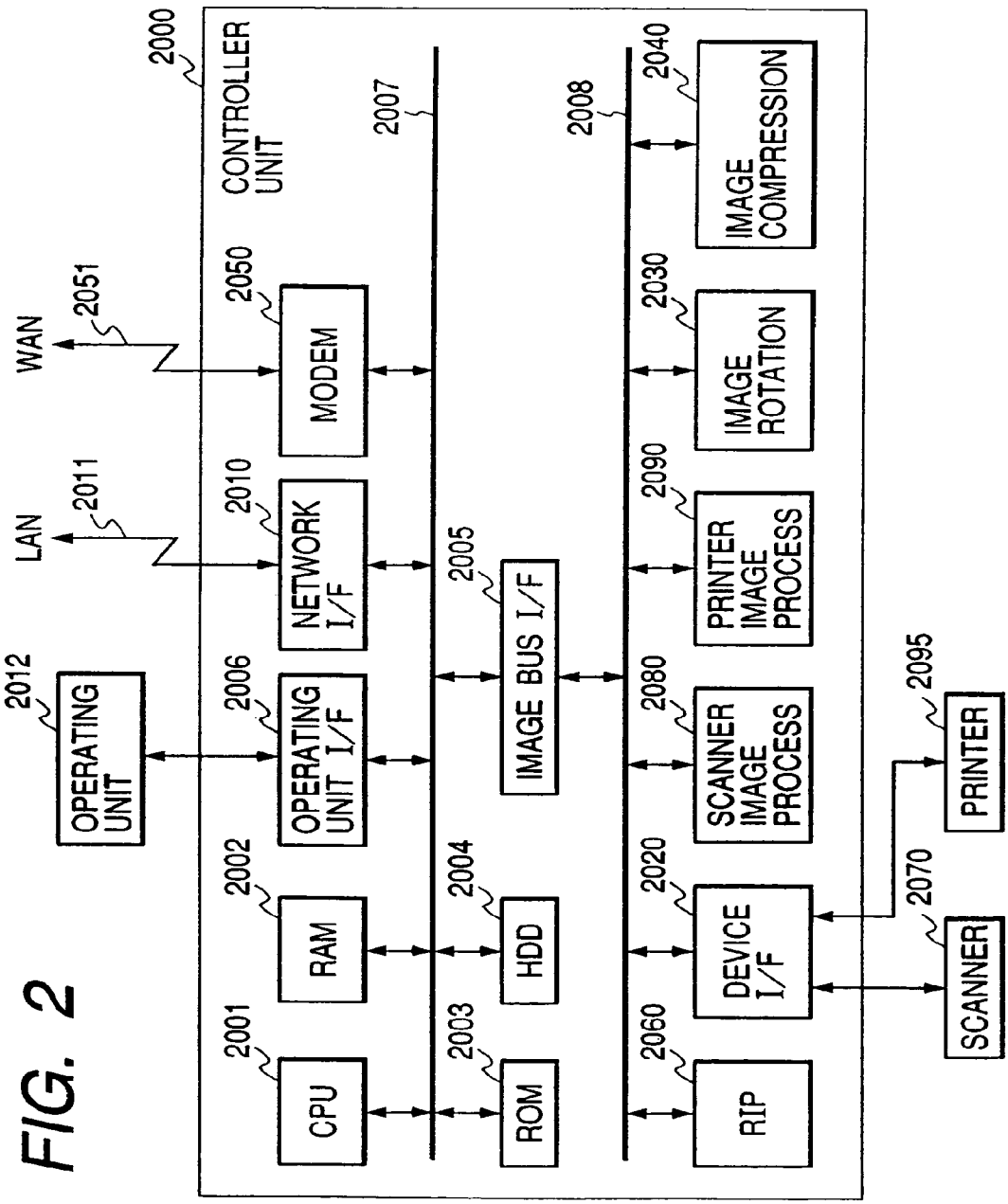
FIG. 2 is a block diagram showing a construction of a control system of a copying machine in the system.

FIG. 2 is a block diagram showing an outline of a construction of a control system of the copying machine 1001 mentioned above in the first embodiment of the invention.

A controller unit 2000 is a controller which is connected to a scanner 2070 as an image input device and a printer 2095 as an image output device. The controller unit 2000 is also connected to a local area network (LAN) 2011 such as Ethernet 1006 or the like and a telephone line (WAN) 2051 and is used to input and output image information or device information.

A CPU 2001 is a controller to control the whole system. An RAM 2002 is a system work memory for allowing the CPU 2001 to operate and is an image memory to temporarily store the image data. An ROM 2003 is a boot ROM in which a boot program for the system has been stored.

An HDD 2004 is a hard disk drive to store system software and the image data. An operating unit I/F 2006 is an interface unit with an operating unit (UI) 2012 and outputs the image data to be displayed in the operating unit 2012 to the operating unit 2012. The operating unit I/F 2006 also functions to notify the CPU 2001 of information such as an instruction of a job and the like including a destination, a transmission method, and the like inputted from the operating unit 2012 by the operator of the present system.

A network I/F 2010 is connected to the LAN 2011 and inputs and outputs information. A modem 2050 is connected to the telephone line 2051 and inputs and outputs information.

The above devices are arranged on a system bus 2007. An image bus I/F 2005 is a bus bridge for connecting the system bus 2007 and an image bus 2008 to transfer the image data at a high speed and converting a data structure.

The image bus 2008 is constructed by a PCI bus or IEEE1394. The following devices are arranged on the image bus 2008.

First, a raster image processor (RIP) 2060 develops a PDL code into a bit map image. A device I/F unit 2020 connects the scanner 2070 or printer 2095 serving as an image input/output device to the controller unit 2000 and performs a conversion of a synchronous/asynchronous system of the image data.

A scanner image processing unit 2080 performs a correction, a modification, or an edition to the input image data. A printer image processing unit 2090 performs a correction, a resolution conversion, or the like of the printer for print output image data. An image rotation unit 2030 rotates the image data. An image compression unit 2040 performs a compressing/decompressing process of JPEG for multivalue image data and performs a compressing/decompressing process of JBIG, MMR, or MH for binary image data.

Figure 3:
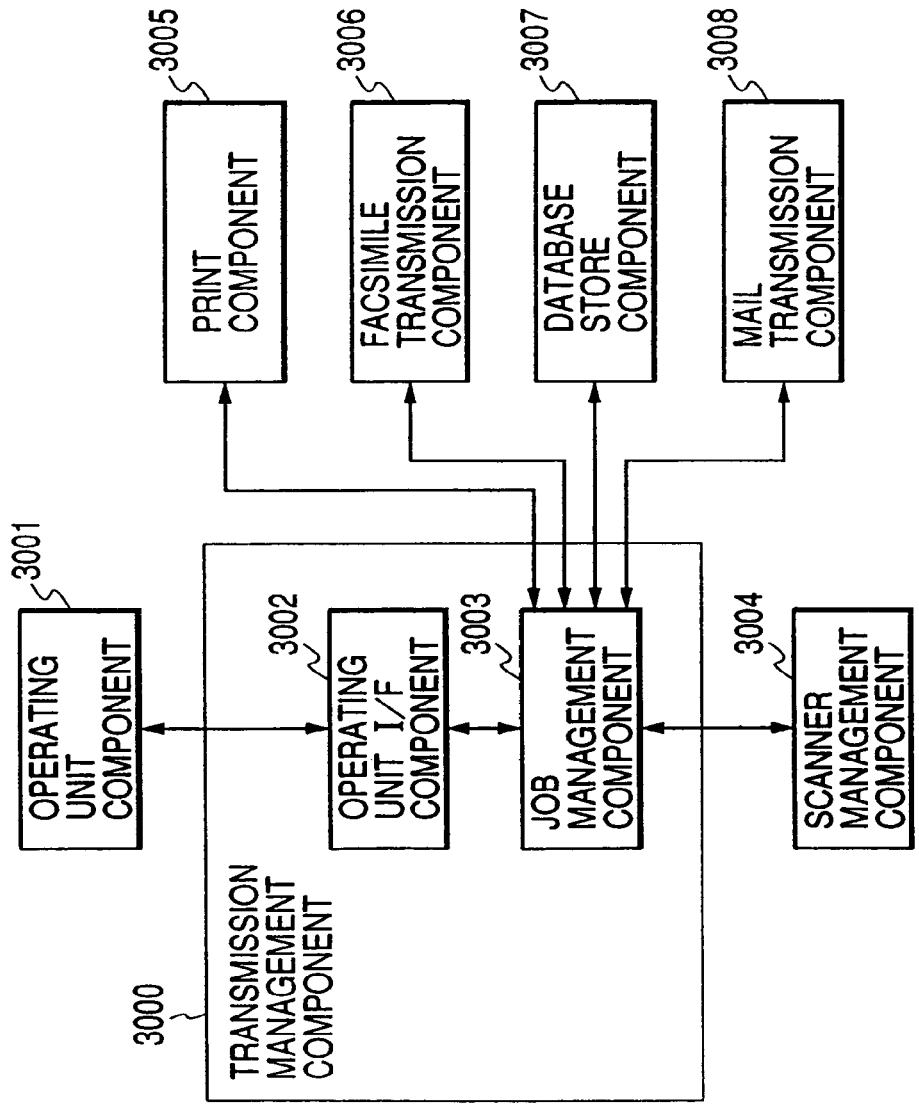
FIG. 3 is a block diagram showing a construction of software which is installed into the copying machine.

FIG. 3 is a block diagram showing a construction of software of the data transmission system in the first embodiment. The software shown in FIG. 3 has been installed in the copying machine 1001. The software has been stored on the HDD 2004. The CPU 2001 reads out the software and executes the control operation. Each component is individually constructed every function and operates in an interlocked relation manner. Each component can be individually changed.

A transmission management component 3000 instructs to start the reading operation of the original by a scanner management component 3004 in accordance with a process command from an operating unit component 3001. By issuing a transmission process command to a print component 3005, a facsimile transmission component 3006, a database store component 3007, and a mail transmission component 3008, the transmission management component 3000 can execute each process for the generated image data. The print component 3005 enables the printer 2095 to print the image based on the input data and can send the image data to the printer 1002 and enables the printer 1002 to print it. The facsimile transmission component 3006 transmits the input data through the telephone line 2051 by the existing facsimile system. The database store component 3007 stores the input data into the database 1004 or another database. The mail transmission component 3008 transmits the existing E-mail via the mail server 1004, LAN 2011, or WAN 2051.

The transmission management component 3000 is constructed by: an operating unit I/F component 3002 to check destination information designated by the operator; the scanner management component 3004; and a job management component 3003 to perform a job control among the transmission components.

FIG. 8 is a diagram showing a data example of each transmission destination information to be previously registered prior to issuing the transmission job in the first embodiment.

Each of the transmission destination information is inputted from the operating unit 2012 by the operator before the transmitting operation and stored onto the HDD 2004.

Each transmission destination holds a destination name (Name), a transmitting method (Type), a transmission destination (Address), a data format (DataType), a compression format (CompressionType), and a pixel format (BitsPerPixel) as information. A plurality of data formats (DataType), compression formats (CompressionType), and pixel formats (BitsPerPixel) can be held for one destination name.

FIG. 9 is an explanatory diagram showing a data example regarding processing capabilities of a plurality of destinations in component ability information held in each of the transmission components 3005, 3006, 3007, and 3008 in the first embodiment.

The print component 3005, facsimile transmission component 3006, database store component 3007, and mail transmission component 3008 hold the component ability information as program information, respectively. Each of the transmission components 3005, 3006, 3007, and 3008 holds information indicating whether transmission commands (MultiAddress) in which a plurality of destinations are designated for one job can be processed in a lump, or, if they can be processed, information indicating how many destinations (MaxMultiAddress) which can be accepted are supported as ability information.

Figure 4:
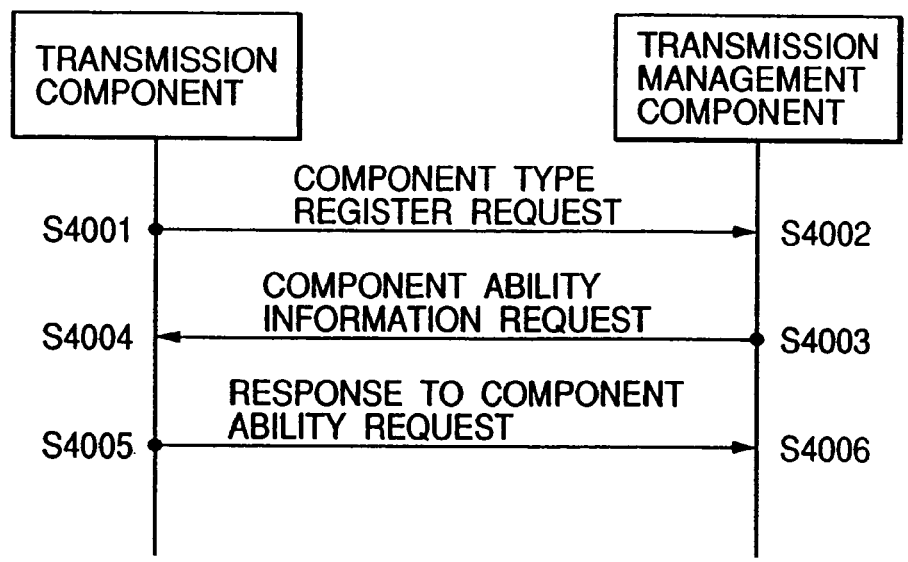
FIG. 4 is an explanatory diagram showing a message sequence in a registering process of component ability information in the embodiment of the invention.

FIG. 4 is an explanatory diagram showing a message sequence of processes when each of the transmission components 3005, 3006, 3007, and 3008 registers its own component ability information into the transmission management component in the first embodiment.

When the copying machine 1001 is activated, each of the transmission components 3005, 3006, 3007, and 3008 issues a ComponentType register request to the transmission management component 3000 in step S4001. When the request is received in step S4002, the transmission management component 3000 issues a component ability information request to each of the transmission components 3005, 3006, 3007, and 3008 in step S4003.

When the request is received in step S4004, each of the transmission components 3005, 3006, 3007, and 3008 issues component ability information with the construction as shown in FIG. 9 held as program information to the transmission management component 3000 as a component ability information response in step S4005.

The transmission management component 3000 receives the response in step S4006 and registers the component type information and the component ability information of each of the transmission components 3005, 3006, 3007, and 3008.

Figure 5B:
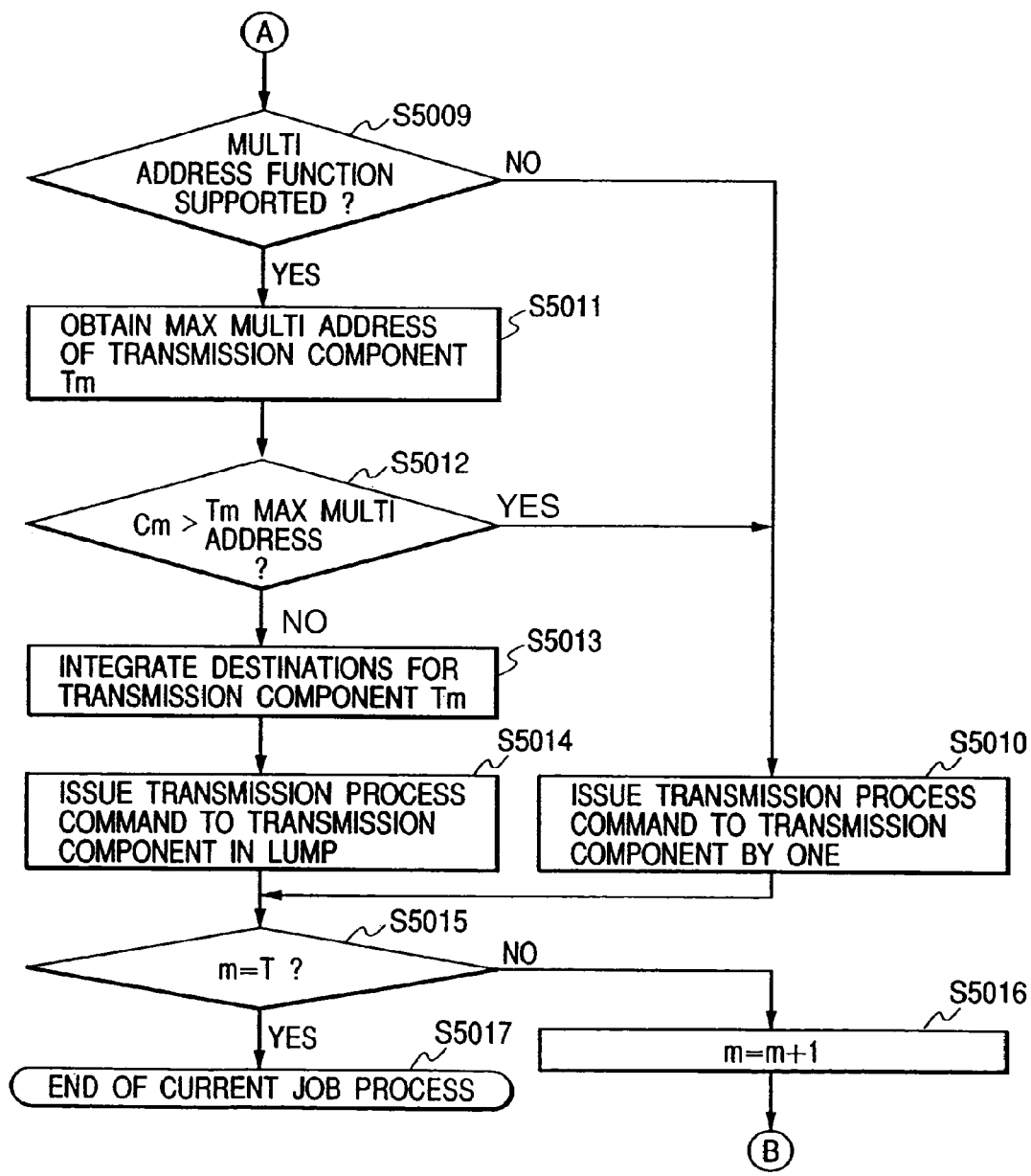
FIG. 5, composed of FIGS. 5A and 5B, is a flowchart showing a destination integrating process in the first embodiment.

FIGS. 5A and 5B are flowcharts showing a process to control jobs on the basis of each transmission destination information and each component ability information when the transmission management component accepts the job in the first embodiment.

When a transmission job is issued on the basis of an instruction from the operator, the job is accepted in step S5001. In step S5002, the initialization of the jobs such that the number of destinations (A) designated by the operator is obtained, the number of types (T) of the transmission components is obtained, the number of destinations ($C_1 \ldots C_m$, $1 \le m \le T$) using each type is cleared, and the like is performed.

Subsequently, the type of transmission component which is used by a destination An among the destinations designated by the operator is obtained in step S5003. The number of destinations ($C_m$) is increased by "1" in step S5004 in accordance with the type to be used.

Subsequently, a check is made in step S5005 to see if n is equal to the number A of transmission destinations. If NO, n is increased by "1" (n=n+1) in step S5006, the processing routine is returned to step S5003, and the processes are continued. If YES, step S5007 follows and m is set to 1 (m=1) and a destination process to each transmission component is started.

Plural destination processing ability information (MultiAddress) of a transmission component $T_m$ is obtained in step S5008. A check is made in step S5009 to see if a MultiAddress function is supported. If the MultiAddress function is not supported like a facsimile transmission or the like, by issuing a transmission process command to the transmission component $T_m$ one by one in step S5010, a transmitting process of each destination using the transmission component $T_m$ is performed. The processing routine advances to step S5015.

If the MultiAddress function is supported, the maximum number of jobs which can be simultaneously processed (TmMaxMultiAddress) in the plural destination processes of the transmission component $T_m$ is obtained in step S5011.

A check is made in step S5012 to see if the number of destinations ($C_m$) exceeds TmMaxMultiAddress. If it exceeds, by issuing the transmission process command to the transmission component $T_m$ one by one in step S5010, the transmitting process of the destination using the transmission component $T_m$ is performed. Step S5015 follows.

If it does not exceed, destination information of a plurality of destinations using the transmission component $T_m$ is integrated in a lump into a secondary job in step S5013. The transmission process command is issued in a lump to the transmission component $T_m$ in step S5014 by the integrated secondary job. After completion of the process for the destination using the transmission component $T_m$, step S5015 follows.

A check is made in step S5015 to see if m is equal to the number of types (T) of the transmission components. If NO, m is increased by "1" (m=m+1) in step S5016, the processing routine is returned to step S5008, and a process for the next transmission component is continued. If m is equal to T, the process regarding the current job is finished in step S5017.

Figure 6:
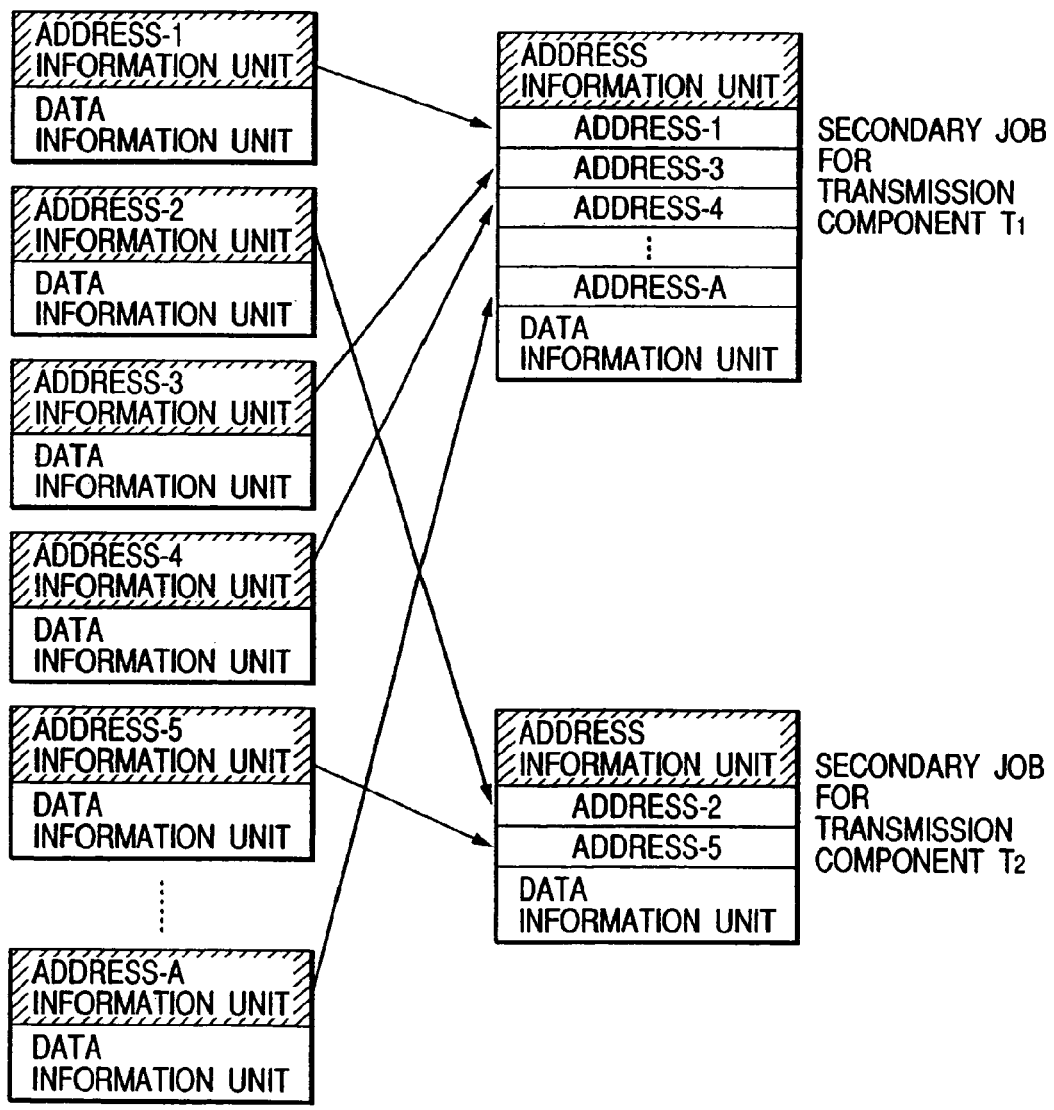
FIG. 6 is an explanatory diagram showing a job integrating process in the first embodiment.

FIG. 6 is an explanatory diagram showing a process to integrate in a lump destination information of a plurality of destinations in which the transmission management component uses the same transmission component (has the MultiAddress function) into a secondary job in the first embodiment.

As shown in the diagram, in step S5013, a data structure having Address-1 information unit to Address-A information unit and a transmission data information unit to transmit is divided into a structure in which one Address information unit uses the common transmission component among a plurality of addresses from Address-1 to Address-A and is converted into a data structure in which a single transmission data information unit is shared by a plurality of addresses.

In the embodiment, although the device having the MultiAddress function has been set to the mail transmission component, it is possible to regard that the device has the MultiAddress function so long as it has the ability to receive a job having a plurality of destinations with respect to one data and successively perform the transmitting process as mentioned above in, for example, a facsimile transmission component.

Second Embodiment

In the first embodiment, when the number of destinations ($C_m$) using the transmission component $T_m$ does not exceed the maximum number of jobs which can be simultaneously processed (TmMaxMultiAddress) in the plural destination process of the relevant transmission component $T_m$, the destinations are integrated in a lump to one secondary job every transmission component. In the following second embodiment, however, even if $C_m$ exceeds the maximum number of destinations which can be managed in a lump with respect to one job, namely, the maximum number of jobs which can be simultaneously processed (TmMaxMultiAddress), the destinations are integrated to a plurality of secondary jobs comprising the destinations of the number that is equal to or less than TmMaxMultiAddress.

A fundamental system construction, a fundamental construction of a control system, a construction of software, and a message sequence of the process to register self component ability information into the transmission management component of the second embodiment are similar to those in FIGS. 1 to 4 of the first embodiment. Since an example of data of each transmission destination information in the second embodiment is similar to that in FIG. 8 described in the first embodiment, their descriptions are omitted here.

Figure 7B:
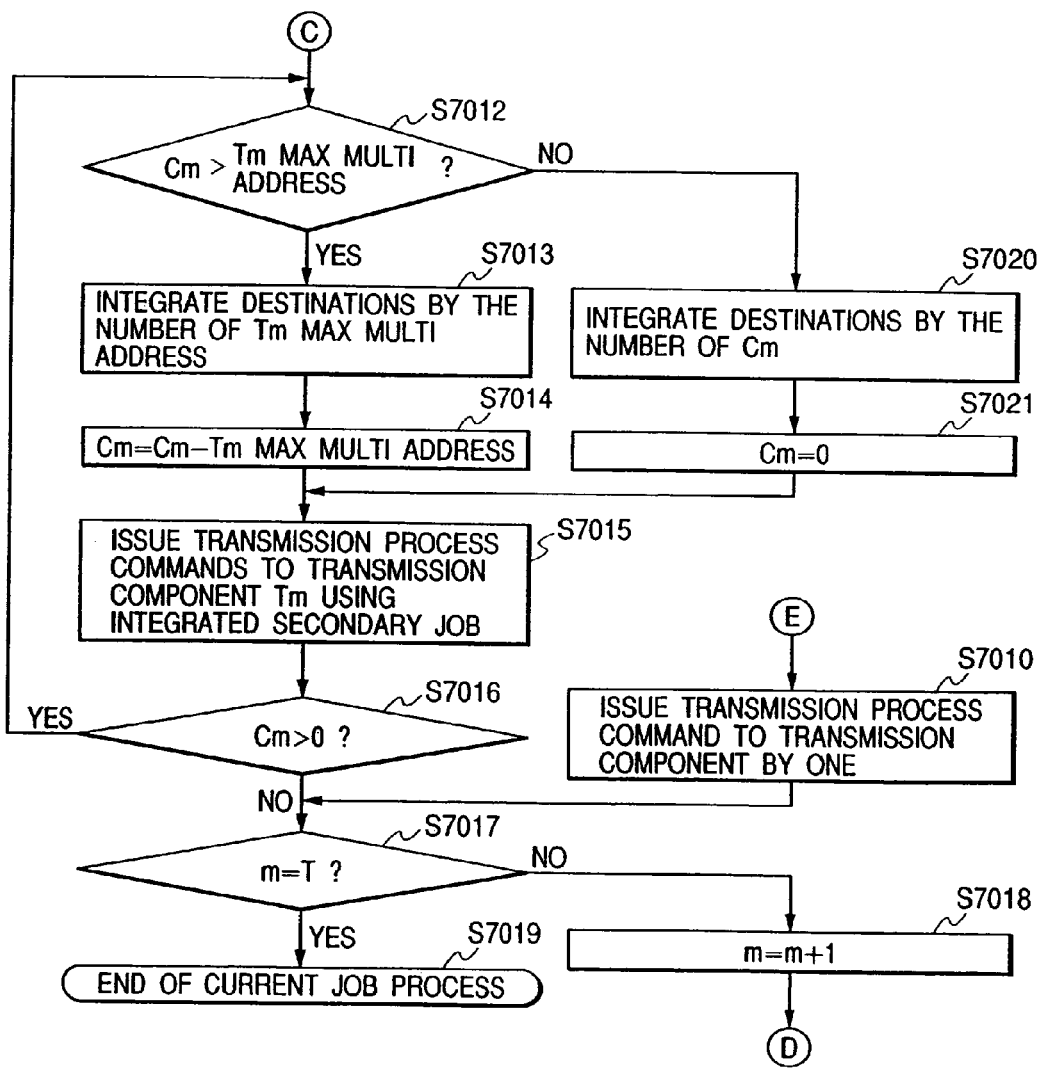
FIG. 7, composed of FIGS. 7A and 7B, is a flowchart showing a job integrating process in the second embodiment of the invention.

FIGS. 7A and 7B are flowcharts showing a process such that the transmission management component integrates the destinations on the basis of each transmission destination information and each component ability information when the job is accepted in the second embodiment.

When the transmission job is issued on the basis of an instruction from the operator, the job is accepted in step S7001. In step S7002, the initialization of the jobs such that the number of destinations (A) designated by the operator is obtained, the number of types (T) of the transmission components is obtained, the number of destinations ($C_1 \ldots C_m$, $1 \le m \le T$) using each type is cleared, and the like is performed.

Subsequently, the type of transmission component which is used by the destination An among the destinations designated by the operator is obtained in step S7003. The number of destinations ($C_m$) is increased by "1" in step S7004 in accordance with the type to be used.

Subsequently, a check is made in step S7005 to see if n is equal to the number A of transmission destinations. If NO, n is increased by "1" (n=n+1) in step S7006 and the processing routine is returned to step S7003 and the processes are continued. If YES, step S7007 follows and m is set to 1 (m=1) and a destination process to each transmission component is started.

Plural destination process information (MultiAddress) of the transmission component $T_m$ is obtained in step S7008. A check is made in step S7009 to see if a MultiAddress function is supported. If the MultiAddress function is not supported, by issuing a transmission process command to the transmission component $T_m$ one by one in step S7010, a transmitting process of the destination using the transmission component $T_m$ is performed. The processing routine advances to step S7017.

If the MultiAddress function is supported, the maximum number of jobs which can be simultaneously processed (TmMaxMultiAddress) in the plural destination process of the transmission component $T_m$ is obtained in step S7011.

A check is made in step S7012 to see if the number of destinations ($C_m$) exceeds (TmMaxMultiAddress). If it exceeds, the process to integrate the destinations of the number (TmMaxMultiAddress) is performed in step S7013. A process of $C_m=C_m$-TmMaxMultiAddress is performed in step S7014. Step S7015 follows. If $C_m$ does not exceed it, the process to integrate the $C_m$ addresses is performed in step S7020. $C_m=0$ is set in step S7021 and step S7015 follows.

In step S7015, the transmission process command is issued to the transmission component $T_m$ in a lump by the secondary job integrated in the above steps. A check is made in step S7016 to see if any other remaining destinations exist ($C_m>0$).

If the remaining destinations exist, the processing routine is returned to step S7012 and the process is continued. If there is no remaining destination, step S7017 follows and a check is made to see if m is equal to the number of types (T) of the transmission components. If NO, m=m+1 is set in step S7018 and the processing routine is returned to step S7008 and the process is continued. If m is equal to T, the processes regarding the current job are finished in step S7019.

It is also possible to use a method such that the programs to execute the operations of the embodiments as mentioned above are previously stored into a storage medium such as floppy disk, hard disk, CD-ROM, memory card, or the like and the programs are read out by an adapted reading apparatus and executed by the CPU 2001.

According to the embodiments as described above, in the data transmission system which is constructed by a plurality of different kinds of transmission components and a transmission manager to manage them and can simultaneously transmit data to a plurality of transmission destinations, information of the plurality of transmission destinations is previously registered, ability information of the plurality of transmission components is obtained, and the destinations are integrated on the basis of each transmission destination information and each component ability information, so that a plurality of transmission destinations are integrated into some secondary jobs in accordance with certain conditions and the process command can be issued to each transmission component.

Thus, the number of times of data conversion in the transmission component can be reduced and a load of the processes can be reduced. By issuing the process command to the transmission component after the destinations were integrated, the batch transmitting function for a plurality of destinations which the transmission component has can be used. Further, an overhead of commands/responses between the transmission manager and the transmission components can be reduced.

Since the transmission manager and the transmission components are individually constructed, for example, even if the function or specifications of the transmission component is changed, the transmission manager obtains various information from the transmission components, so that it is possible to easily cope with such a change and the number of designs (change points) can be suppressed.

Although the transmission manager and the transmission components have been installed in one apparatus in the above embodiments, the invention is not limited to it. For example, the invention can be applied to a case where the transmission manager is installed in a PC (for instance, client computer 1005) and the transmission components are installed into another apparatus and data from the PC is transmitted by using the other apparatus.

Third Embodiment

Although there are various advantages by individually constructing the transmission manager and the transmission components as mentioned above, there is a case where the job which could be executed before cannot be executed by the change of the transmission component. In the following embodiment, a process to properly cope with such a situation will now be described.

In the following embodiment, as for the component ability information held by each of the transmission components 3005, 3006, 3007, and 3008, data shown in FIG. 10 is used as data regarding the data format which can be processed, and data shown in FIG. 11 is used as data regarding the maximum number of jobs which can be simultaneously processed. Those data is shown as examples and other data can be used.

Figure 12B:
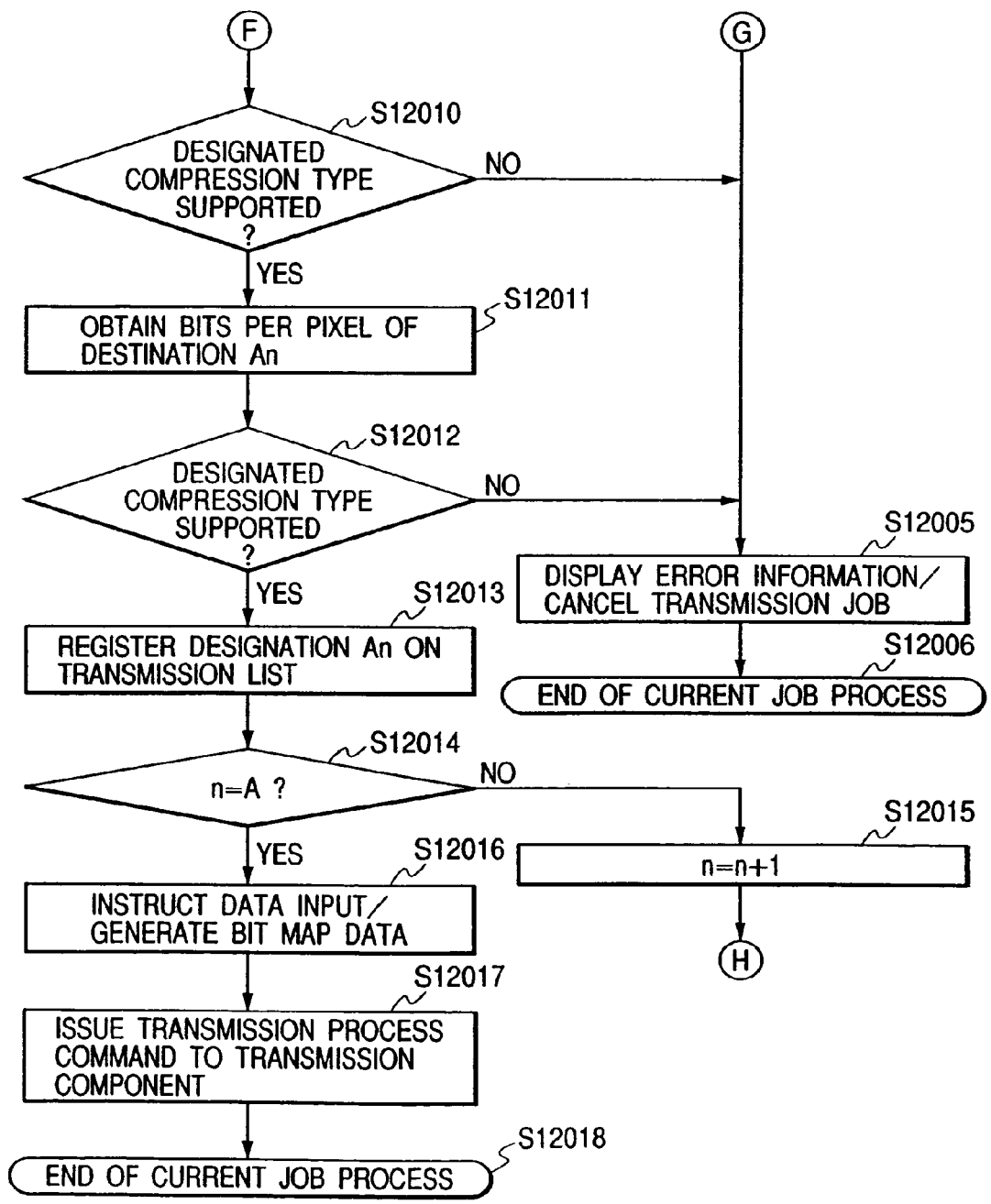
FIG. 12, composed of FIGS. 12A and 12B, is a flowchart showing a process to discriminate whether a process is possible or impossible on the basis of each transmission destination information and each component ability information when a job is accepted in the third embodiment of the invention.

FIGS. 12A and 12B are flowcharts showing a process to discriminate whether the process is possible or impossible on the basis of each transmission destination information and each component ability information when a job (processing contents are designated) from the operator is accepted in the third embodiment.

These flowcharts show processes which are controlled by instructions which are executed by the CPU on the basis of a program for the transmission management component which has been installed in a memory of another apparatus (for example, PC such as a client computer 1005) different from the copying machine 1001 or the apparatus in which the transmission components are installed.

First, when a transmission job is issued on the basis of an instruction from the operator, the job is accepted in step S12001. The initialization of the jobs such that the number of destinations (A) is obtained and the like is performed in step S12002.

The type of transmission component which is used by the destination An is subsequently obtained in step S12003. A check is made in step S12004 to see if the transmission component of the obtained type has been registered. If NO, error information indicative of the absence of the component to execute the designated job is displayed in the operating unit 2012 or a display of the PC as another apparatus in step S12005. Processes regarding the current job are finished in step S12006.

If the transmission component of the obtained type has been registered, step S12007 follows and DataType of the destination An is obtained. A check is made in step S12008 to see if the transmission component to be used next supports the DataType obtained in step S12007. If NO, a message indicating that the designated transmission component does not support the data format of the job inputted and error information to promote the operator to reinput the job are displayed in the operating unit 2012 or the display of the PC in step S12005. Processes regarding the current job are finished in step S12006.

If it is supported, step S12009 follows and CompressionType of the destination An is obtained. A check is subsequently made in step S12010 to see if the transmission component to be used next supports the CompressionType obtained in step S12009 with respect to the DataType obtained in step S12007. If it is not supported, a message indicating that the designated transmission component does not support the compression format of the inputted job and error information to promote the operator to reinput the job are displayed in the operating unit 2012 or the display of the PC in step S12005. Processes regarding the current job are finished in step S12006.

If it is supported, step S12011 follows and BitsPerPixel of the destination An is obtained. A check is subsequently made in step S12012 to see if the transmission component to be used next supports the BitsPerPixel obtained in step S12011 with respect to the DataType obtained in step S12007 and the CompressionType obtained in step S12009. If it is not supported, a message indicating that the designated transmission component does not support the pixel format of the inputted job and error information to promote the operator to reinput the job are displayed in the operating unit 2012 or the display of the PC in step S12005. Processes regarding the current job are finished in step S12006.

If it is supported, step S12013 follows and the destination An is registered into a transmission list. A check is subsequently made in step S12014 to see if n is equal to the number of transmission destination's (A). If NO, n=n+1 is set in step S12015 and the processing routine is returned to step S12003 and the processes are continued. If n is equal to A, step S12016 follows and a reading instruction is performed to the scanner 2070 in accordance with the designated contents or the image data is extracted from the application on the PC and bit map data is generated on the basis of the image data. A transmission process command is issued to each transmission component in step S12017. Processes regarding the current job are finished in step S12018.

Fourth Embodiment

According to the above third embodiment, with respect to the ability of each transmission component, a check is made to see if data format (DataType), compression format (CompressionType), and pixel format (BitsPerPixel) designated in each transmission destination are supported by the transmission component to be used. In the following fourth embodiment, however, it is discriminated by the maximum number of jobs which can be simultaneously processed by the transmission component which is used by each transmission destination.

As one of the various component ability information, each transmission component holds the value of the maximum number of jobs which can be simultaneously processed (MaxJobs) as shown in the example in FIG. 11.

Figure 13B:
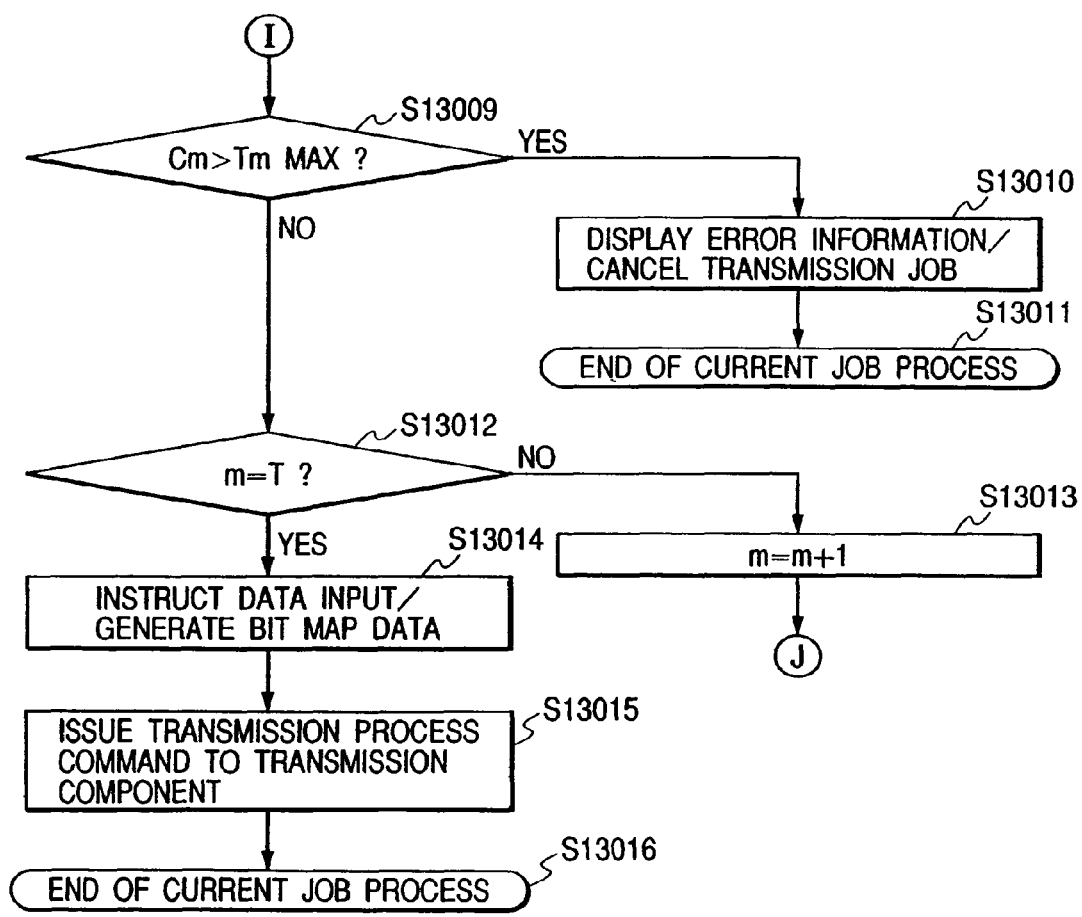
FIG. 13, composed of FIGS. 13A and 13B, is a flowchart showing a process to discriminate whether a process is possible or impossible on the basis of each transmission destination information and each component ability information when a job is accepted in the fourth embodiment of the invention.

FIGS. 13A and 13B are flowcharts showing a process to discriminate whether the processes are possible or impossible on the basis of each transmission destination information and each component ability information when the job (designation of the processing contents) from the operator is accepted in the fourth embodiment. These flowcharts also show processes which are controlled in accordance with instructions which are executed by the CPU on the basis of the programs installed in the memory in a manner similar to the case of FIGS. 12A and 12B.

When the transmission job is issued on the basis of the instruction from the operator, the job is accepted in step S13001. In step S13002, the initialization of the jobs such that the number of destinations (A) is obtained, the number of types (T) of the transmission components is obtained, the number of destinations ($C_1 \ldots C_m$, $1 \le m \le T$) using each type is cleared, and the like is performed.

Subsequently, the type of transmission component which is used by a destination An is obtained in step S13003. The number of destinations ($C_m$) is increased by "1" in step S13004 in accordance with the type to be used. Subsequently, a check is made in step S13005 to see if n is equal to the number A of transmission destinations. If NO, n=n+1 is set in step S13006, the processing routine is returned to step S13003, and the processes are continued. If YES, step S13007 follows and m=1 is set and the discrimination about the number of transmission components is started.

The maximum number of jobs which can be simultaneously processed (TmMax) of the transmission component $T_m$ is subsequently obtained in step S13008. A check is made in step S13009 to see if the number of destinations ($C_m$) exceeds TmMax. If $C_m$ exceeds TmMax, a message showing such a fact is displayed and error information showing a retry of the designation of the job is displayed in the operating unit 2012 or the display of the PC in step S13010. Processes regarding the current job are finished in step S13011.

If it does not exceed, step S13012 follows and a check is made to see if m is equal to Type (T) of the transmission component. If it is not equal to T, m=m+1 is set in step S13013, the processing routine is returned to step S13008, and the processes are continued. If m is equal to T, step S13014 follows. A reading instruction is issued to the scanner 2070 in accordance with the designation contents or the application on the PC fetches the image data and generates bit map data on the basis of it. A transmission process command is issued to each transmission component in step S13015. Processes regarding the current job are finished in step S13016.

It is also possible to use a method such that the programs to execute the operations of the embodiments as mentioned above are previously stored into a storage medium such as floppy disk, hard disk, CD-ROM, memory card, or the like and the programs are read out by an adapted reading apparatus and executed by the CPU 2001.

According to the third and fourth embodiments as described above, in the data transmission system which is constructed by a plurality of different kinds of transmission components and a transmission manager to manage them and can simultaneously transmit data to a plurality of transmission destinations, by providing the procedure such that, when a job which is simultaneously transmitted is accepted, whether the process for the job is possible or impossible is discriminated on the basis of each transmission destination information and each component ability information, if a job which cannot be transmitted is accepted, it is determined that an error occurred, and the processes can be stopped.

Thus, the errors during the execution of the process of the transmission component can be reduced. A situation such that the transmitted data cannot be handled on the transmission destination side can be avoided.

As shown in the embodiment, in the system for generating the image data by the scanner and simultaneously transmitting data to a plurality of destinations, the job which cannot be simultaneously transmitted is decided as an error prior to the scanning operation, so that the vain scanning operation can be prevented.

The invention can be applied to a system comprising a plurality of equipments (for example, a host computer, interface equipment, a reader, a printer, and the like) or can be applied to an apparatus comprising one equipment (for instance, a copying machine, a facsimile apparatus).

The invention also incorporates a case where program codes of software to realize the foregoing functions of the embodiment are supplied to a computer in an apparatus or a system connected to various devices so as to make those devices operative in order to realize the functions of the embodiments mentioned above, and the various devices are operated in accordance with programs stored in the computer (CPU or MPU) of the system or apparatus, thereby embodying the invention.

In such a case, the program codes themselves of the software realize the functions of the embodiments mentioned above. The program codes themselves and means for supplying the program codes to the computer, for example, a storage medium in which the program codes have been stored construct the invention.

As a storage medium to store the program codes, for example, it is possible to use any of a floppy disk, a hard disk, an optical disk, a magneto-optic disk, a CD-ROM, a magnetic tape, a non-volatile memory card, an ROM, and the like.

It will be obviously understood that the program codes are incorporated in the embodiments of the invention in not only a case where a computer executes the supplied program codes, so that the functions of the embodiments mentioned above are realized but also a case where the program codes operate in cooperation with the OS (operating system) which is operating on the computer or another application software or the like, and the functions of the embodiments mentioned above are realized.

The invention also incorporates a case where the supplied program codes are stored into a memory equipped for a function expanding board of a computer or a function expanding unit connected to the computer, and after that, a CPU or the like provided for the function expanding board or function expanding unit executes a part or all of the actual processes on the basis of instructions of the program codes, and the functions of the embodiments are realized by those processes.

Although the present invention has been described with respect to the preferred embodiments, the invention is not limited to the foregoing embodiments but many modifications and variations are possible within the spirit and scope of the appended claims of the invention.

What is claimed is:

1. A data processing apparatus, comprising:
   a receiving unit configured to receive a destination of an electronic mail (e-mail), the receiving unit being able to receive a plurality of destinations which are more than a maximum number of destinations for one e-mail;
   dividing unit configured to divide the plurality of destinations received by the receiving unit in to a plurality of groups of destinations which are equal to or less than the maximum number; and
   a transmitting unit configured to transmit each of a plurality of e-mails to each of the plurality of groups of destinations,
   wherein the transmitting unit transmits, in a case where the number of a plurality of destinations received by the receiving unit is equal to or less than the maximum number, one e-mail for which all of the plurality of destinations are set, and
      wherein at least one of the receiving unit, the dividing unit and the transmitting unit is implemented by a memory and a processor.

2. The data processing apparatus according to claim 1, further comprising a storing unit configured to store the maximum number.

3. The data processing apparatus according to claim 1, further comprising a fax transmitting unit configured to perform fax transmission when fax destination is designated.

4. The data processing apparatus according to claim 1, further comprising a reading unit configured to read an image of an original and generate image data, wherein the transmitting unit transmits each of the plurality of e-mails to which the generated image data are attached.

5. The data processing apparatus according to claim 1, wherein the receiving unit being able to receive the plurality of destinations which are more than the maximum number of destinations being able to be processed by one e-mail.

6. The data processing apparatus according to claim 1, wherein the receiving unit being able to receive, for one transmission job, the plurality of destinations which are more than the maximum number of destinations for one e-mail.

7. The data processing apparatus according to claim 1, wherein the receiving unit being able to receive, for one transmission job, the plurality of destinations which are more than the maximum number of destinations being able to be processed by one e-mail.

8. The data processing apparatus according to claim 1, wherein the transmitting unit transmits one e-mail for each of the plurality of groups of destinations is set to each of the plurality of groups of destinations.

9. A control method of a data processing apparatus, the control method comprising:
   receiving, by a receiving unit, a destination of an electronic mail (e-mail), the receiving unit being able to receive a plurality of destinations which are more than a maximum number of destinations for one e-mail;
   dividing, by a dividing unit, the plurality of destinations received by the receiving unit to a plurality of groups of destinations which are equal to or less than the maximum number; and
   transmitting, by a transmitting unit, each of a plurality of e-mails to each of the plurality of groups of destinations,
   wherein, in a case where the number of a plurality of destinations received by the receiving unit is equal to or less than the maximum number, one e-mail for which all of the plurality of destinations are set is transmitted by the transmitting unit.

10. The control method according to claim 9, wherein the maximum number is stored in a storing unit.

11. The control method according to claim 9, wherein fax transmission is performed when fax destination is designated.

12. The control method according to claim 9, further comprising reading an image of an original and generating image data, wherein each of the plurality of e-mails to which the generated image data are attached is transmitted.

13. A non-transitory computer-readable storage medium storing a computer-executable program, the computer-executable program having instructions for performing a control method of a data processing apparatus, the control method comprising:
   receiving, by a receiving unit, a destination of an electronic mail (e-mail), the receiving unit being able to receive a plurality of destinations which are more than a maximum number of destinations for one e-mail;
   dividing, by a dividing unit, the plurality of destinations received by the receiving unit to a plurality of groups of destinations which are equal to or less than the maximum number, and
   transmitting, by a transmitting unit, each of a plurality of e-mails to each of the plurality of groups of destinations,
   wherein, in a case where the number of a plurality of destinations received by the receiving unit is equal to or less than the maximum number, one e-mail for which all of the plurality of destinations are set is transmitted by the transmitting unit.

* * * * *